US012768530B2

(12) United States Patent
Qin

(10) Patent No.: US 12,768,530 B2
(45) Date of Patent: Oct. 20, 2026

(54) ELECTRICAL CONNECTOR INSTALLATION STRUCTURE FOR ELECTRICAL APPLIANCE, AND FAN LAMP

(71) Applicant: Foshan Weina Lighting Appliance Co., Ltd., Foshan (CN)

(72) Inventor: Yue Qin, Foshan (CN)

(73) Assignee: Foshan Weina Lighting Appliance Co., Ltd., Foshan (CN)

( * ) Notice: Subject to any disclaimer, the term of this patent is extended or adjusted under 35 U.S.C. 154(b) by 0 days.

(21) Appl. No.: 19/306,079

(22) Filed: Aug. 21, 2025

(65) Prior Publication Data

US 2026/0185695 A1 Jul. 2, 2026

(30) Foreign Application Priority Data

Dec. 27, 2024 (CN) ........................ 202423237075.X

(51) Int. Cl.
*F21V 33/00* (2006.01)
*F04D 25/08* (2006.01)
(Continued)

(52) U.S. Cl.
CPC .......... *F21V 33/0096* (2013.01); *F21V 21/03* (2013.01); *F21V 21/34* (2013.01); *F21V 23/06* (2013.01); *F04D 25/088* (2013.01); *F21K 9/23* (2016.08); *F21K 9/232* (2016.08); *F21K 9/233* (2016.08); *F21K 9/235* (2016.08); *F21S 8/03* (2013.01); *F21S 8/031* (2013.01); *F21S 8/04* (2013.01); *F21S 8/043* (2013.01); *F21S 8/046* (2013.01); *F21V 17/104* (2013.01); *F21V 17/12* (2013.01); *F21V 17/16* (2013.01); *F21V 17/162* (2013.01); *F21V 17/164* (2013.01); *F21V 17/168* (2013.01); *F21V 19/0015* (2013.01); *F21V 19/0025* (2013.01); *F21V 19/0035* (2013.01); *F21V 19/0055* (2013.01);
(Continued)

(58) Field of Classification Search
CPC ............. F21V 33/0096; F21V 19/0015; F21V 19/0025; F21V 19/0035; F21V 19/0055; F21V 19/006; F21V 19/0065; F21V 19/007; F21V 19/06; F21V 17/104; F21V 17/12; F21V 17/16; F21V 17/162; F21V 17/164; F21V 17/168; F21V 21/02; F21V 21/03; F04D 25/088; F21S 8/03; F21S 8/031; F21S 8/04; F21S 8/043; F21S 8/046; F21K 9/23; F21K 9/232; F21K 9/233; F21K 9/235
See application file for complete search history.

(56) References Cited

U.S. PATENT DOCUMENTS 5,586,867 A * 12/1996 Mehlos ................ F04D 29/601
416/170 R
12,123,424 B1 * 10/2024 Yang .................. F21V 33/0096
(Continued)

*Primary Examiner* — Colin J Cattanach
(74) *Attorney, Agent, or Firm* — Craft Chu PLLC; Andrew W. Chu

(57) ABSTRACT

An electrical connector installation structure for an electrical appliance, a fan, and a fan lamp are disclosed. The electrical connector installation structure for an electrical appliance includes a body provided with an electrical plug at a top of the body; and a sleeve sleeved over the body, where the sleeve is slidably arranged in an up-down direction relative to the body, such that the sleeve wraps the electrical plug, and an upper end of the sleeve is provided with a fixing structure.

7 Claims, 3 Drawing Sheets

(51) Int. Cl.

| | |
|---|---|
| ***F21K 9/23*** | (2016.01) |
| ***F21K 9/232*** | (2016.01) |
| ***F21K 9/233*** | (2016.01) |
| ***F21K 9/235*** | (2016.01) |
| ***F21S 8/00*** | (2006.01) |
| ***F21S 8/04*** | (2006.01) |
| ***F21V 17/10*** | (2006.01) |
| ***F21V 17/12*** | (2006.01) |
| ***F21V 17/16*** | (2006.01) |
| ***F21V 19/00*** | (2006.01) |
| ***F21V 19/06*** | (2006.01) |
| ***F21V 21/02*** | (2006.01) |
| ***F21V 21/03*** | (2006.01) |
| ***F21V 21/34*** | (2006.01) |
| ***F21V 23/06*** | (2006.01) |

(52) U.S. Cl.

CPC ......... *F21V 19/006* (2013.01); *F21V 19/0065* (2013.01); *F21V 19/007* (2013.01); *F21V 19/06* (2013.01); *F21V 21/02* (2013.01)

(56) References Cited

U.S. PATENT DOCUMENTS

| | | | | |
|---|---|---|---|---|
| 12,331,750 | B1 * | 6/2025 | Botkin | F04D 29/601 |
| 2001/0022937 | A1 * | 9/2001 | Bucher | F04D 25/088<br>416/244 R |
| 2002/0163813 | A1 * | 11/2002 | Tseng | F04D 25/088<br>362/406 |

* cited by examiner

ELECTRICAL CONNECTOR INSTALLATION STRUCTURE FOR ELECTRICAL APPLIANCE, AND FAN LAMP

CROSS-REFERENCE TO RELATED APPLICATION

This U.S. patent application claims foreign priority to Chinese Patent Application No. 202423237075X, filed on Dec. 27, 2024, the contents of which are herein incorporated by reference.

TECHNICAL FIELD

The present disclosure relates to the technical field of electrical appliance installation, and in p articular, to an electrical connector installation structure for an electrical appliance, a fan, and a fan lamp.

BACKGROUND

Current electrical appliances such as fans, lamps, fan lamps, etc., when being installed, are directly fixed to the electrical socket through the lamp base structure in order to improve the convenience of installation, thereby achieving fixed installation fixation and electrical connection. However, the connection structure between the lamp base structure and the electrical socket is weak in strength and prone to shaking. Moreover, the lamp base structure may even be separated from the electrical socket over time, making it difficult to bear heavy electrical appliances, and affecting the aesthetics due to the exposure of the lamp base structure and the electrical socket.

SUMMARY

The present disclosure aims to provide an electrical connector installation structure for an electrical appliance, a fan, and a fan lamp, so as to solve one or more technical problems in the existing technology and at least provide a beneficial choice or creative conditions.

The technical solutions used to solve the above technical problems are as follows.

First, the present disclosure provides an electrical connector installation structure for an electrical appliance, which includes:

- a body provided with an electrical plug at a top of the body;
- a sleeve sleeved over the body, wherein the sleeve is slidably arranged in an up-down direction relative to the body such that the sleeve wraps the electrical plug, and an upper end of the sleeve is provided with a fixing structure.

The beneficial effects of the present disclosure are as follows.

When in use, the body is connected to an external electrical socket through the electrical plug to achieve electrical connection of the electrical appliance, and then the sleeve is moved. The sleeve is fixedly connected to the external wall or ceiling through a fixing structure to shield the electrical plug and the external electrical socket. This not only improves the aesthetics, but also enables the sleeve to serve as a fixed support point for the body to improve the stability of the body installation.

As a further improvement of the above technical solution, the electrical connector installation structure for an electrical appliance further includes a connecting sleeve, the connecting sleeve is fixedly sleeved over the body, and the sleeve is slidably sleeved over the connecting sleeve.

As a further improvement of the above technical solution, the connecting sleeve includes a first sleeve and a second sleeve, the first sleeve is sleeved over the body, an upper end of the first sleeve is provided with a first connecting ring extending inward, the first connecting ring is connected to a top surface of the body, a lower end of the first sleeve is provided with a second connecting ring extending outward, a lower end of the second sleeve is connected to an outer edge of the second connecting ring, and the sleeve is slidably sleeved over the second sleeve.

As a further improvement of the above technical solution, the electrical plug is a standard lamp base, a conical sleeve is provided at a lower end of the standard lamp base, and a mounting ring is provided at a lower end of the conical sleeve and is clamped between the first connecting ring and the top surface of the body.

As a further improvement of the above technical solution, the mounting ring is evenly distributed with a plurality of first through holes, the first connecting ring is provided with a plurality of second through holes corresponding to the first through holes, the top surface of the body is provided with screw holes corresponding to the first through holes, in which connecting bolts are arranged respectively, and the connecting bolts pass through the respective second through holes and the respective first through holes in sequence from top to bottom and then are connected to the respective screw holes.

As a further improvement of the above technical solution, a plurality of first guide portions are provided on an outer periphery of the connecting sleeve, a plurality of second guide portions are provided on an inner periphery of the sleeve, and the first guide portions and the second guide portions are slidably matched with each other up and down respectively.

As a further improvement of the above technical solution, a plurality of third guide portions are provided on the outer periphery of the body, a plurality of fourth guide portions are provided on the inner periphery of the sleeve, and the third guide portions are slidably matched with the fourth guide portions up and down respectively.

As a further improvement of the above technical solution, the fixing structure includes a fixing ring connected to the upper end of the sleeve, the fixing ring is arranged to extend outward, the fixing ring is provided with a plurality of fixing holes, in which fixing bolts are arranged respectively.

As a further improvement of the above technical solution, an upper port of the sleeve is a conical port, and an outer edge of the fixing ring is provided with a shielding ring extending upward.

In addition, the present disclosure further provides a fan lamp, which includes the electrical connector installation structure for an electrical appliance, and further includes a light-emitting assembly and a fan assembly. A bottom of the body is provided with a vertically arranged fixing shaft, the light-emitting assembly is fixedly mounted on a bottom end of the fixing shaft, and the fan assembly includes a wind wheel rotatably sleeved over the fixing shaft and a motor unit for driving the wind wheel to rotate.

In addition, the present disclosure further provides a fan, which includes the electrical connector installation structure for an electrical appliance, and further includes a fan assembly. A bottom of the body is provided with a vertically arranged fixing shaft, and the fan assembly includes a wind wheel rotatably sleeved over the fixing shaft and a motor unit for driving the wind wheel to rotate.

Other features and advantages of the present disclosure will be set forth in the following description, and in part will become apparent from the description, or may be understood by implementing the present disclosure.

BRIEF DESCRIPTION OF DRAWINGS

The present disclosure is further described below in conjunction with the accompanying drawings and embodiments.

REFERENCE SIGNS

Figure 1:
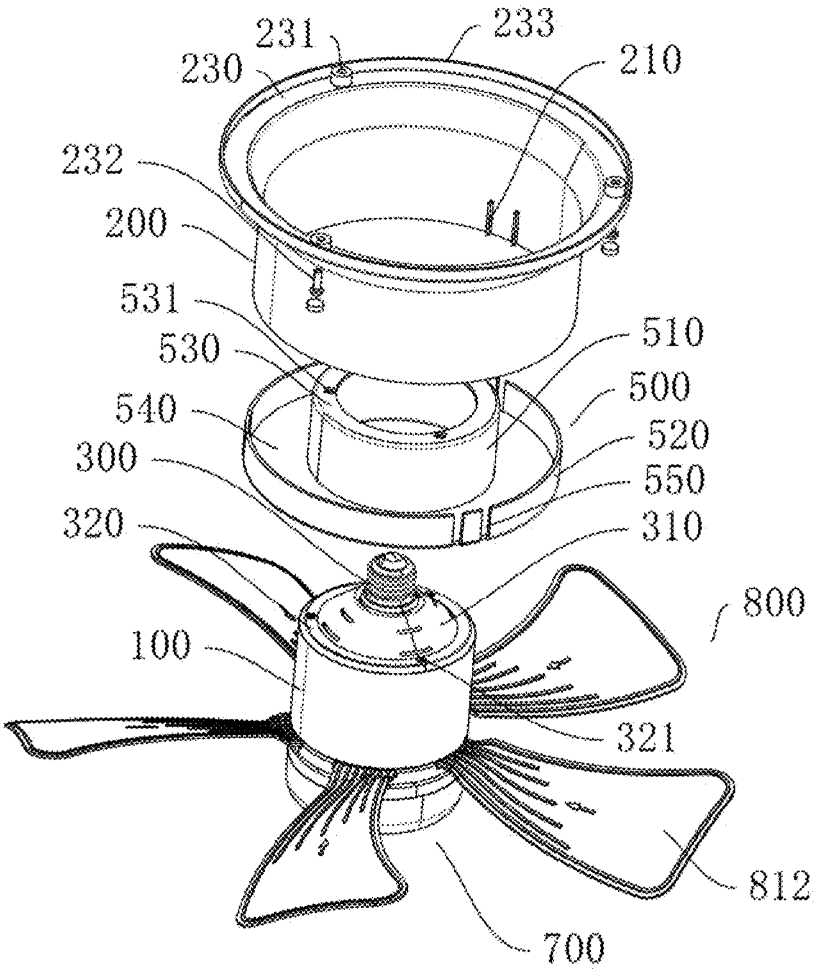
FIG. 1 is an exploded view of a fan lamp provided by an embodiment of the present disclosure, in which the electrical plug is a standard lamp base.

- body 100; screw hole 110; third guide portion 120; fixing shaft 130;
- sleeve 200; second guide portion 210; fourth guide portion 220; fixing ring 230; fixing hole 231; fixing bolt 232; shielding ring 233;
- standard lamp base 300; conical sleeve 310; mounting ring 320; first through hole 321; plug connector 400;
- connecting sleeve 500; first sleeve 510; second sleeve 520; first connecting ring 530; second through hole 531; second connecting ring 540; first guide portion 550;
- connecting bolt 600;
- light-emitting assembly 700; lamp panel 710; lampshade 720; light-emitting panel 730;
- fan assembly 800; wind wheel 810; rotating wheel 811; wind blade 812; motor unit 820.

DETAILED DESCRIPTION

Embodiments of the present disclosure are described in detail below, and examples of the embodiments are shown in the accompanying drawings, wherein the same or similar reference numerals throughout represent the same or similar elements or elements with the same or similar functions. The embodiments described below with reference to the accompanying drawings are exemplary and are only used to explain the present disclosure, and should not be construed as limiting the present disclosure.

In the description of the present disclosure, it should be understood that the descriptions involving orientation, such as the orientation or positional relationship indicated by the terms "up", "down", and the like, are based on the orientation or positional relationship shown in the drawings, and are only for the convenience of describing the present disclosure and simplifying the description, rather than indicating or implying that the device or element referred to must have a specific orientation, be constructed and operated in a specific orientation, and therefore should not be understood as a limitation on the present disclosure.

In the description of the present disclosure, terms such as "a plurality of" refers to two or more. If words such as "first" and "second" are described, they are only used to distinguish the technical features and should not be understood as indicating or implying relative importance or implicitly indicating the number of the indicated technical features or implicitly indicating the sequence of the indicated technical features.

In the description of the present disclosure, unless otherwise clearly defined, terms such as "arranging", "installing", "connecting", and the like should be understood in a broad sense, and those of ordinary skills in the art can reasonably determine the specific meanings of the above terms in the present disclosure based on the specific content of the technical solutions.

The technical solutions of the present disclosure will be clearly and completely described below in conjunction with the accompanying drawings. Obviously, the embodiments described below are only some embodiments of the present disclosure, not all embodiments.

Current electrical appliances such as fans, lamps, fan lamps, etc., when being installed, are directly fixed to the electrical socket through the electrical plug structure in order to improve the convenience of installation, thereby achieving fixed installation fixation and electrical connection. However, the connection structure between the electrical plug structure and the electrical socket is weak in strength and prone to shaking. Moreover, the electrical plug structure may even be separated from the electrical socket over time, making it difficult to bear heavy electrical appliances, and affecting the aesthetics due to the exposure of the electrical plug structure and the electrical socket.

Therefore, the present disclosure proposes an electrical connector installation structure for an electrical appliance, as shown in FIG. 1. The electrical connector installation structure for an electrical appliance in the present embodiment comprises: a body 100 and a sleeve 200.

The body 100 is a main body of the electrical appliance, and an axis of the body 100 extends in the up-down direction. In some other embodiments, according to different installation modes, the body 100 can be arranged to extend in the horizontal direction or in other directions. The present embodiment takes the axis of the body 100 extending in the up-down direction as an example.

Figure 2:
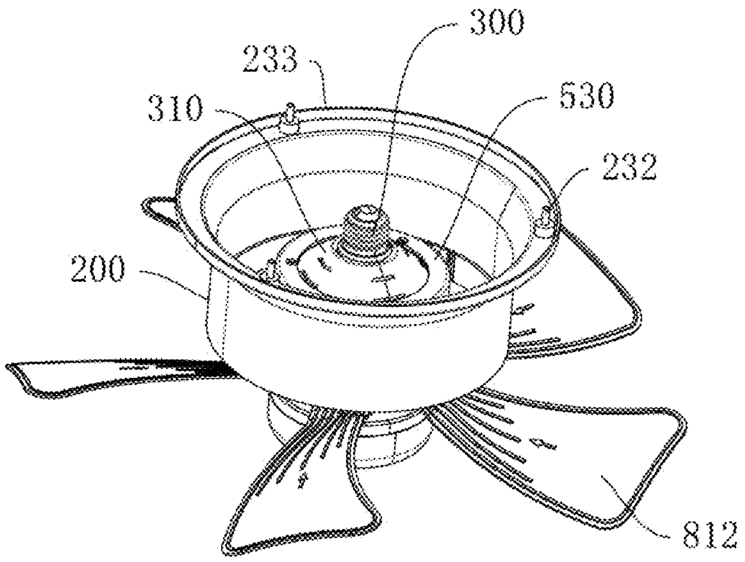
FIG. 2 is a schematic view of a fan lamp provided by an embodiment of the present disclosure, in which the electrical plug is a standard lamp base.
Figure 3:
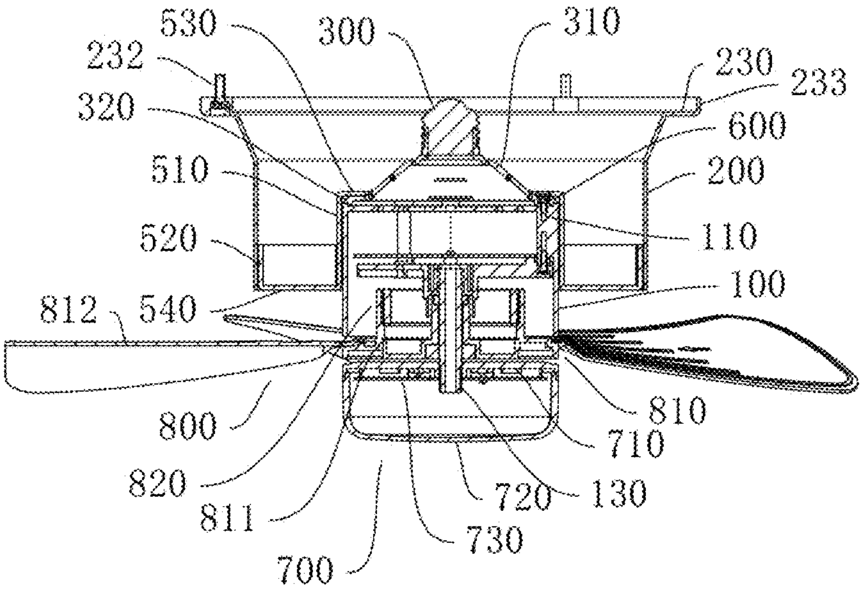
FIG. 3 is a cross-sectional view of a fan lamp provided by an embodiment of the present disclosure, in which the electrical plug is a standard lamp base.
Figure 4:
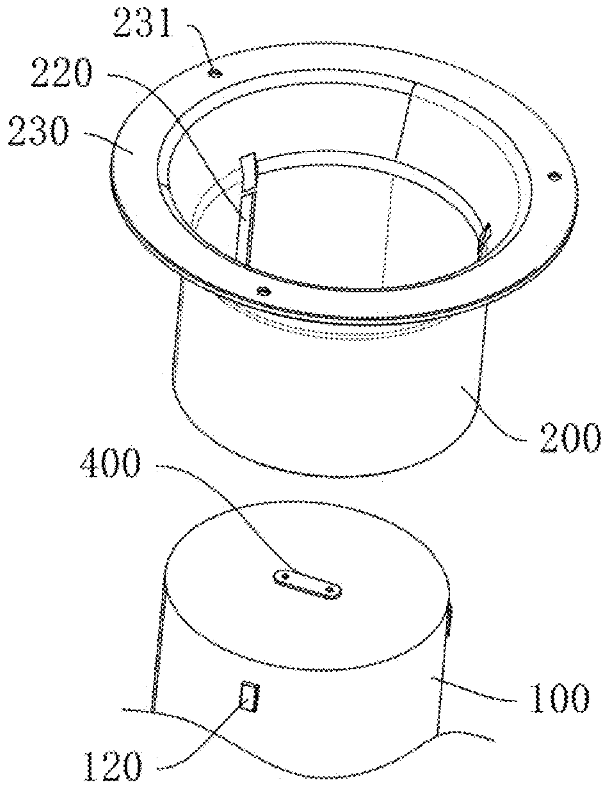
FIG. 4 is an exploded view of an electrical connector installation structure for an electrical appliance provided by an embodiment of the present invention, in which the electrical plug is a plug connector and no connecting sleeve is provided.

An electrical plug is provided on the top of the body 100, and the electrical plug is used to connect to an external electrical socket to achieve electrical connection. The electrical plug may be in various forms. As shown in FIG. 1 to FIG. 3, the electrical plug in this embodiment is a standard lamp base 300, and the standard lamp base 300 is threadedly connected to the external spiral electrical socket to achieve electrical connection. In some other embodiments, as shown in FIG. 4, the electrical plug is a plug connector 400, and the plug connector 400 is plugged into an external plug-in electrical socket to achieve electrical connection. In other embodiments, the electrical plug may adopt a magnetic attraction structure.

The sleeve 200 is sleeved over the body 100, and the sleeve 200 is slidably arranged relative to the body 100 in the up-down direction, such that the sleeve 200 can wrap the electrical plug. A fixing structure is provided at the upper end of the sleeve 200, and the fixing structure is used to connect with an external wall or ceiling.

When in use, the body 100 is connected to the external electrical socket through the electrical plug to achieve electrical connection of the electrical appliance, and then the sleeve 200 is moved upward. The sleeve 200 is fixedly connected to an external wall or ceiling through a fixing structure to shield the electrical plug and the external electrical socket. This not only improves the aesthetics, but also enables the sleeve 200 to serve as a fixed support point for the body 100 to improve the stability of the installation of the body 100.

The present disclosure proposes two modes for installing the sleeve 200. The first mode is to add a connecting sleeve 500 to the existing body 100, such that the sleeve 200 can be mounted by sliding up and down. The second mode is to directly modify the body 100, and during the molding process, the body 100 matching and fitting the sleeve 200 is molded.

As shown in FIG. 1 to FIG. 3, a connecting sleeve 500 is added to the existing body 100. The connecting sleeve 500 is fixedly sleeved over the body 100, and the sleeve 200 is slidably sleeved over the connecting sleeve 500. The connecting sleeve 500 serves as a transition connection. This embodiment only adds an additional connecting sleeve 500 on the existing electrical appliance.

Specifically, as shown in FIG. 1 to FIG. 3, the connecting sleeve 500 in this embodiment includes a first sleeve 510 and a second sleeve 520. The first sleeve 510 is sleeved over the body 100, and a first connecting ring 530 extending inward is provided at the upper end of the first sleeve 510. The first connecting ring 530 is connected to the top surface of the body 100. A second connecting ring 540 extending outward is provided at the lower end of the first sleeve 510. The lower end of the second sleeve 520 is connected to the outer edge of the second connecting ring 540. The sleeve 200 is slidably sleeved over the second sleeve 520. During installation, the connecting sleeve 500 is sleeved over the body 100 from top to bottom, and is connected to the top surface of the body 100 through the first connecting ring 530 to achieve fixed installation, and then the sleeve 200 is inserted.

As shown in FIG. 3, when the electrical plug is a standard lamp base 300, a conical sleeve 310 is provided at the lower end of the standard lamp base 300, and a mounting ring 320 is provided at the lower end of the conical sleeve 310 and is clamped between the first connecting ring 530 and the top surface of the body 100. When the connecting sleeve 500 is fixed, the standard lamp base 300 can be fixed at the same time to improve the efficiency of assembly.

The mounting ring 320 in this embodiment is evenly distributed with a plurality of first through holes 321, the first connecting ring 530 is provided with a plurality of second through holes 531 corresponding to the first through holes 321, the top surface of the body 100 is provided with a plurality of screw holes 110 corresponding to the first through holes 321. Connecting bolts 600 are arranged in the respective screw holes 110. The connecting bolts 600 pass through the respective second through holes 531 and the respective first through holes 321 from top to bottom in sequence and then are connected to the respective screw holes 110.

A plurality of first guide portions 550 are provided on the outer periphery of the connecting sleeve 500, and a plurality of second guide portions 210 are provided on the inner periphery of the sleeve 200. The first guide portions 550 and the second guide portions 210 are slidably matched up and down to realize the up and down adjustment of the sleeve 200. The first guide portions 550 in this embodiment are arranged on the outer periphery of the second sleeve 520.

As shown in FIG. 4, when the body 100 is directly matched with the sleeve 200 slidably, a plurality of third guide portions 120 are provided on the outer periphery of the body 100, a plurality of fourth guide portions 220 are provided on the inner periphery of the sleeve 200, and the third guide portions 120 and the fourth guide portions 220 are matched by sliding up and down.

The fixing structure in this embodiment includes a fixing ring 230 connected to the upper end of the sleeve 200. The fixing ring 230 is arranged to extend outward. The fixing ring 230 is provided with a plurality of fixing holes 231. Fixing bolts 232 are arranged in the fixing holes 231 respectively. When the sleeve 200 is fixed, the fixing bolts 232 pass through the respective fixing holes 231 from bottom to top and are connected to the ceiling.

In order to improve the support stability of the sleeve 200, the upper port of the sleeve 200 is a conical port, and a shielding ring 233 extending upward is provided on the outer edge of the fixing ring 230 which serves to shield the upper end of the sleeve 200.

As shown in FIG. 1 to FIG. 3, the present disclosure further provides a fan lamp, which includes the electrical connector installation structure for an electrical appliance. When installing the fan lamp, the electrical plug is firstly connected to the external electrical socket to achieve the electrical connection of the fan lamp, and then the sleeve 200 is moved upward. The sleeve 200 is fixedly connected to the external wall or ceiling through a fixing structure to shield the electrical plug and the external electrical socket.

The fan lamp in this embodiment further includes a light-emitting assembly 700 and a fan assembly 800. As shown in FIG. 3, a vertically arranged fixing shaft 130 is provided at the bottom of the body 100. The light-emitting assembly 700 is fixedly mounted at the bottom end of the fixing shaft 130, and the fan assembly 800 includes a wind wheel 810 rotatably sleeved over the fixing shaft 130 and a motor unit 820 for driving the wind wheel 810 to rotate. The motor unit 820 is a conventional motor on the market.

The motor unit 820 drives the wind wheel 810 to rotate around the fixing shaft 130 to achieve the blowing function of a fan, and the light-emitting assembly 700 is arranged at the lower end of the fixing shaft 130 to achieve lighting, such that the rotation of the wind wheel 810 does not affect the lighting of the light-emitting assembly 700.

The light-emitting assembly 700 includes a lamp panel 710 connected to the bottom end of the fixing shaft 130, a lampshade 720 sleeved over the bottom of the lamp panel 710, and a light-emitting panel 730 disposed on the bottom surface of the lamp panel 710.

The wind wheel 810 includes a rotating wheel 811 rotatably connected to the fixing shaft 130, and fan blades 812 distributed on the outer periphery of the rotating wheel 811. The fan blades 812 are connected to a plug-in block, and the outer periphery of the rotating wheel 811 is provided with a plug-in slot that matches the plug-in block. The fan blades 812 can be removed during packaging and transportation, and then mounted when used.

In some embodiments, the present disclosure further provides a fan, which includes the electrical connector installation structure for an electrical appliance, and further includes a fan assembly 800. A vertically arranged fixing shaft 130 is provided at the bottom of the body 100. The fan assembly 800 includes a wind wheel 810 rotatably sleeved over the fixing shaft 130 and a motor unit 820 for driving the wind wheel 810 to rotate. It could be understood that the fan may be obtained from the above fan lamp without the light-emitting assembly 700.

In some other embodiments, the electrical connector installation structure for an electrical appliance may be applicable to other electrical appliances.

In the description of this specification, the description with reference to the terms such as "an embodiment", "some embodiments", "illustrative embodiment", "example", "specific example", or "some examples" means that the specific features, structures, materials or characteristics described in combination with the embodiment or example are included in at least one embodiment or example of the present disclosure. In this description, the exemplary expressions of the above terms do not necessarily refer to the same embodiment or example. Furthermore, the specific features, structures, materials, or characteristics described may be combined in any suitable manner in any one or more embodiments or examples.

The embodiments of the present disclosure are described in detail above in conjunction with the accompanying drawings, but the present disclosure is not limited to the above embodiments, and various changes can be made within the knowledge scope of those of ordinary skills in the art without departing from the gist of the present disclosure.

What is claimed is:

1. An electrical connector installation structure for an electrical appliance, comprising:

a body provided with an electrical plug at a top of the body; and a sleeve sleeved over the body, wherein the sleeve is slidably arranged in an up-down direction relative to the body, such that the sleeve wraps the electrical plug, and an upper end of the sleeve is provided with a fixing structure;

wherein:

the electrical connector installation structure for an electrical appliance further comprises a connecting sleeve; the connecting sleeve is fixedly sleeved over the body, and the sleeve is slidably sleeved over the connecting sleeve;

the connecting sleeve comprises a first sleeve and a second sleeve, the first sleeve is sleeved over the body, an upper end of the first sleeve is provided with a first connecting ring extending inwardly, the first connecting ring is connected to a top surface of the body, a lower end of the first sleeve is provided with a second connecting ring extending outwardly, a lower end of the second sleeve is connected to an outer edge of the second connecting ring, and the sleeve is slidably sleeved over the second sleeve;

the electrical plug is a standard lamp base, a lower end of the standard lamp base is provided with a conical sleeve, and a lower end of the conical sleeve is provided with a mounting ring clamped between the first connecting ring and the top surface of the body; and the mounting ring is evenly distributed with a plurality of first through holes; the first connecting ring is provided with a plurality of second through holes corresponding to the first through holes; the top surface of the body is provided with screw holes corresponding to the first through holes, in which connecting bolts are arranged respectively; and the connecting bolts pass through the respective second through holes and the respective first through holes in sequence from top to bottom and are then connected to the respective screw holes.

2. The electrical connector installation structure for an electrical appliance according to claim 1, wherein:

a plurality of first guide portions are provided on an outer periphery of the connecting sleeve, a plurality of second guide portions are provided on an inner periphery of the sleeve, and the first guide portions and the second guide portions are slidably matched with each other up and down respectively.

3. The electrical connector installation structure for an electrical appliance according to claim 1, wherein:

a plurality of third guide portions are provided on the outer periphery of the body, a plurality of fourth guide portions are provided on an inner periphery of the sleeve, and the third guide portions and the fourth guide portions are slidably matched with each other up and down respectively.

4. The electrical connector installation structure for an electrical appliance according to claim 1, wherein:

the fixing structure comprises a fixing ring connected to the upper end of the sleeve, the fixing ring is arranged to extend outwards, the fixing ring is provided with a plurality of fixing holes, in which fixing bolts are arranged respectively.

5. The electrical connector installation structure for an electrical appliance according to claim 4 wherein:

an upper port of the sleeve is in the form of a conical port, and an outer edge of the fixing ring is provided with a shielding ring extending upwards.

6. A fan lamp, comprising the electrical connector installation structure for an electrical appliance according to claim 1, and further comprising a light-emitting assembly and a fan assembly, wherein a vertically arranged fixing shaft is provided at a bottom of the body, the light-emitting assembly is fixedly mounted at a bottom end of the fixing shaft, and the fan assembly comprises a wind wheel rotatably sleeved over the fixing shaft, and a motor unit for driving the wind wheel to rotate.

7. A fan, comprising the electrical connector installation structure for an electrical appliance according to claim 1, and further comprising a fan assembly, wherein a vertically arranged fixing shaft is provided at a bottom of the body, and the fan assembly comprises a wind wheel rotatably sleeved over the fixing shaft, and a motor unit for driving the wind wheel to rotate.

* * * * *